United States Patent [19]

Höller

[11] Patent Number: 4,761,952
[45] Date of Patent: Aug. 9, 1988

[54] HYDRAULIC COUPLING

[75] Inventor: Heinz Höller, Crailsheim, Fed. Rep. of Germany

[73] Assignee: Voith Turbo GmbH & Co. KG, Crailsheim, Fed. Rep. of Germany

[21] Appl. No.: 875,269

[22] Filed: Jun. 17, 1986

[30] Foreign Application Priority Data

Jun. 21, 1985 [DE] Fed. Rep. of Germany ....... 3522174

[51] Int. Cl.⁴ .............................................. F16D 33/00
[52] U.S. Cl. ....................................... 60/330; 60/338; 60/357
[58] Field of Search .......................... 60/330, 338, 357

[56]  References Cited

U.S. PATENT DOCUMENTS 2,783,615  3/1957  Gooch et al.
3,237,409  3/1966  Becker.
3,899,887  8/1975  Becker .............................. 60/357 X
3,999,385  12/1976  Hoeller ................................. 60/330
4,516,399  5/1985  Holler et al. ...................... 60/357 X

FOREIGN PATENT DOCUMENTS 1202592  10/1965  Fed. Rep. of Germany.
3231368   5/1984  Fed. Rep. of Germany.
3329854   3/1985  Fed. Rep. of Germany.
1145434  10/1957  France.
 765667   1/1957  United Kingdom.
2011039   4/1979  United Kingdom.

Primary Examiner—Gerald A. Michalsky
Attorney, Agent, or Firm—Kuhn and Muller

[57]  ABSTRACT

A hydraulic coupling is provided which has a primary blade wheel and a secondary blade wheel confining an operating space, said primary wheel having a first delay chamber connected by channels with the operating space located relatively close to the coupling axis and a second delay chamber, predominantly located further away from the coupling axis than the radially outer limitation of the operating space, the second delay chamber being connected with the operating space by large diameter ports, preferably by the radially outer annular gap between the blade wheels.

11 Claims, 3 Drawing Sheets

HYDRAULIC COUPLING

BACKGROUND OF THE INVENTION

This invention relates to hydraulic or fluid couplings and, more particularly, to a hydraulic or fluid coupling having an input member characterized as a bladed primary wheel, and an output member, characterized as a bladed secondary wheel, confining an operating space.

A hydraulic coupling transfers energy from a drive motor to a production machine. In the case of a production machine having a large load or mass or which conveys large loads or masses, e.g. conveyor belts, the hydraulic coupling ensures that the drive motor starts up at a low load. Once the drive motor has attained its rated speed, the production machine is set in motion. During the start-up phase of the production machine, the hydraulic coupling automatically limits the transmitted torque to a specific desired value, thus reducing stress on both the drive motor and the production machine.

The invention relates exclusively to hydraulic couplings constructed such that they can be operated by a constant quantity of fluid, i.e. with the coupling at rest, its inner chamber is filled by a definite volume of working or operating fluid and the volume remains unchanged during operation. Hydraulic couplings having at least one delay chamber rotating with the primary blade wheel in which part of the operating fluid accumulates when the coupling is at rest, are known. This construction permits the possible reduction in the torque transmitted by the coupling during the start-up phase and maintains coupling torques during start-up within certain limits. Other types of hydraulic couplings have an external influence on the fluid level in the operating space, e.g. by means of a scoop tube. These type of couplings may have similar properties. However, the additional expense for the external influence is only worthwhile in the case of high power levels.

A hydraulic coupling is disclosed in German Auslegeschrift No. 12 02 592 which has two delay chambers arranged at the rear side of two blade wheels for the purpose of attaining coupling symmetry. The two delay chambers are located relatively close to the coupling axis of rotation. At approximately the radial center of the operating space, the two blade wheels are provided with overflow channels connecting the delay chambers to the operating space. One of the two delay chambers is also connected to the operating space by way of the outer annular gap existing between the blade wheels.

Further, in German Pat. No. 3231368 and U.S. Pat. No. 4,516,399 there are disclosed hydraulic couplings with only a single delay chamber. In accordance with the disclosure of these patents, the greater the volumetric capacity of the delay chamber, the greater is the possible reduction in the torque transmittal by the hydraulic coupling during the start-up phase. Thus, it is suggested that it is possible to maintain relatively low coupling torques during start-up within certain limits by increasing the size of the delay chamber. In addition, applying further measures as described in DE No. 3231368, the coupling torque, after an initial steep parabolic rise to approximately one-half of its maximum value, can be made to rise to its maximum value at a slow rate. Thus, an advantage is achieved by attaining a relatively delayed maximum coupling torque.

The measures disclosed in the above-noted patents were steps in the right direction. However, in the case of production machines with particularly heavy start-up loads, e.g. conveyor belts, the development of coupling torques during start-up are still too rapid and the shock load occurring during the start-up will reduce the operating life of the conveyor belt.

SUMMARY OF THE INVENTION

An object of the invention is to provide an improved hydraulic coupling in which there is a slower increase in coupling torque during start-up than hitherto has been possible.

In accordance with the invention, a hydraulic coupling is provided with two delay chambers wherein at least a substantial part of one of the two delay chambers is located at a greater distance from the coupling axis than the radially outer limitation of the operating space. This produces the situation in which at the beginning of the start-up phase, that part of the operating fluid which has accumulated in the operating space while at rest, is completely, or at least almost completely, transferred to the second, radially outer delay chamber. This takes place within a very short period of time, i.e. almost immediately, since the connection between the operating space and the outer delay chamber, which is preferably in the shape of the outer annular gap between the two blade wheels, has a very large flow cross-section. The principal feature is that the fluid transferred to the outer delay chamber remains in the said outer delay chamber during the entire time of operation until the next standstill. Thus, during start-up, the operating space is gradually filled only from the first radially inner delay chamber. In other words, the invention has succeeded in almost completely, or even completely, emptying the operating space for a certain period of time, e.g. 3 to 5 seconds. The consequence is that, when the drive motor is switched on, the parabolic rise in coupling torque follows a flatter parabola with a lower height than hitherto. Thus, there is altogether a more uniform and, at least in the start-up phase, a much slower development of coupling torque than was hitherto the case.

The provision of a hydrodynamic coupling with a fluid chamber, whose volumetric capacity is largely located radially outside the radially outer limitation of the coupling operating space, has been disclosed in German Pat. No. 33 29 854. However, the fluid chamber in said coupling is designed as a storage chamber into which compressed air can be admitted. Such fluid chamber is only connected to the operating space by at least one filling and emptying line, and is therefore a hydraulic coupling of the type having an external influence on the fluid level of the operating space.

DETAILED DESCRIPTION

Figure 1:
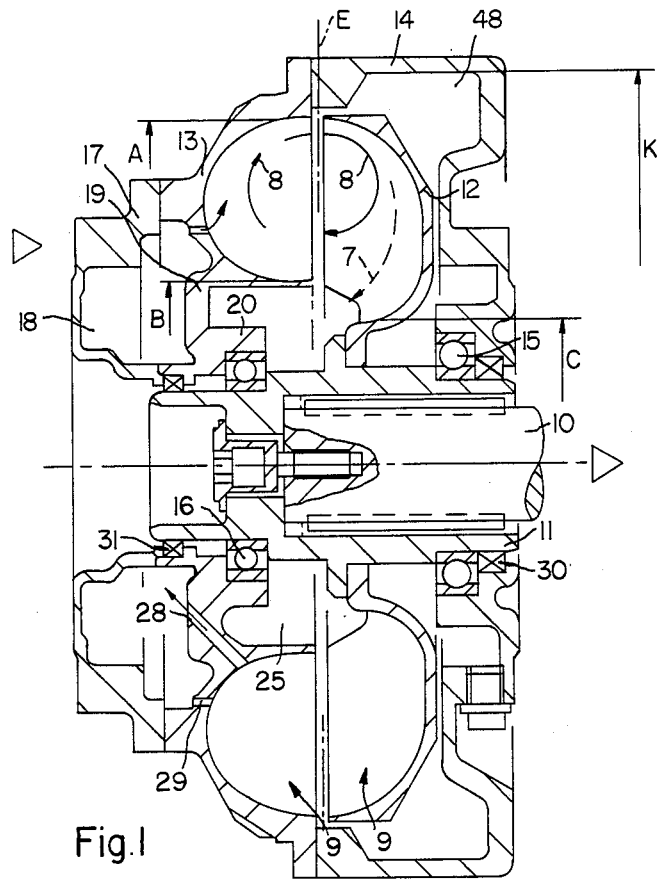
FIG. 1 illustrates a longitudinal cross-section of a hydraulic coupling in accordance with the invention.

Referring now to the drawings, there is illustrated in FIG. 1 a hydraulic coupling with driven shaft 10, to which is fixed a hub 11 of the secondary bladed wheel 12. The primary bladed wheel 13 is mounted on the hub 11 for rotation relative to hub 11 in combination with a coupling shell 14 with the aid of the roller bearings 15 and 16. The primary and secondary wheels comprise a plurality of circumferentially spaced radial vanes. To the outer side of the primary bladed wheel 13 is fixed a drive shell 17 which encloses the first delay chamber 18. The drive shell 17 may be connected to a drive shaft (not shown).

The outer diameter of the blades (of identical size for the two bladed wheels 12 and 13) is indicated by A, the inner diameter of the blades of the primary wheel by B and the inner diameter of the blades of the secondary wheel by C. The ratio of B/A is approximately 0.55, while the ratio of C/A is approximately 0.42. The difference in ratios, however, is of no importance to the invention. The inner diameters of the blades B and C may also be of identical size. The radial center plane of the hydraulic coupling running along the gap between the bladed wheels is indicated by E.

The primary bladed wheel 13 has a wheel disc 19 with an integral wheel hub 20. The wheel disc 19 is located at a relatively large distance from the center plane E and encloses a blade-free radial ram space 25 inside the radius of the blading of the primary wheel 13. The presence of the ram space is also of no importance to the invention; it can be omitted, especially if the two said inner diameters B and C are identical. However, it can assist in the reduction of coupling torque at instances of high slip, e.g. during start-up.

The wheel disc 19 of the primary bladed wheel 13, as a rule, has no ports, bores or the like. Thus, no direct connecting channels is provided between ram space 25 and the first delay chamber 18.

The operating space defined by the two bladed wheels 12 and 13 is indicated by 9. Its radially inner region is connected with the radially inner region of the first delay chamber 18 by channel 28 passing through the wheel disc 19. In this way only fluid is transferred through channel 28 from the operating space 9 into the first delay chamber 18 while the coupling is at rest. On re-start, the liquid can then flow back from the first delay chamber 18 to the operating space 9 via throttling ports 29. To enable the operating space 9 to be emptied temporarily at the beginning of the start-up phase, shell 14 is shaped in such a way that it forms an outer annular chamber 48 which functions as a second delay chamber. Annular chamber 48 is constantly connected to the operating space 9 by the outer annular gap formed by the two bladed wheels 12 and 13. The annular gap generally provides a sufficiently large flow cross-section for connecting the operating space 9 to the annular chamber 48. However, as required, ports can be provided in at least in one of the bladed wheels in addition to or instead of the annular gap.

The diameter K of the annular chamber 48 is substantially greater than the outer diameter A of the blades of wheels 12 and 13. Thus, the volumetric capacity of the annular chamber is mainly located radially outside the operating space 9 defined by the two bladed wheels 12 and 13. The annular chamber 48 can thus receive during start-up, at least a substantial part of the operating fluid which has accumulated in the operating space when the coupling is at rest.

In normal operation, i.e. when the secondary wheel 12 runs at the driven rate corresponding to the normal operating speed of the production machine, the coupling operates with only low slipping. The toroidal flow then prevailing is indicated by the arrows 8. However, the arrows 7 represent the flow occuring at high slipping in the secondary bladed wheel 12. The hydraulic coupling inner chamber is sealed to the exterior by sealing rings 30, 31 provided on the outer side of the roller bearings 15 and 16.

Figure 2:
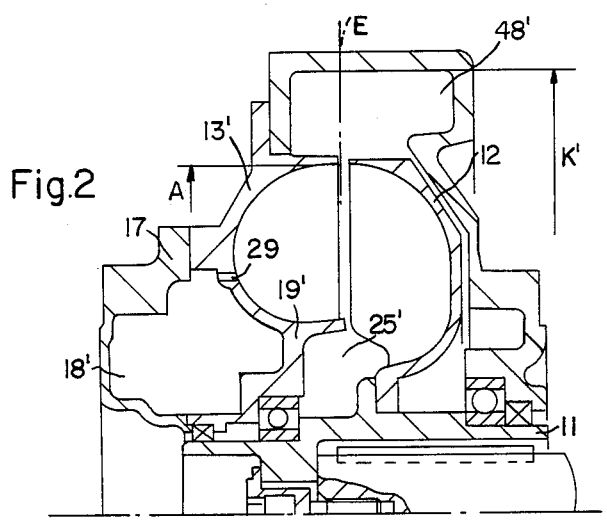
FIG. 2 illustrates a fragmentary longitudinal cross-section of a hydraulic coupling which is another embodiment of the present invention.

In contrast to the structure shown in FIG. 1, the embodiment of the invention illustrated in FIG. 2 has a primary bladed wheel 1' with a wheel disc 19' located a short distance from the center plane E. The ram space 25' is reduced and the size of the first delay chamber 18' is increased, in comparison with the embodiment shown in FIG. 1.

Another difference is that, whereas in FIG. 1 the outer annular chamber 48 is exclusively located to one side of the center plane E, with the result that the annular chamber exclusively confines the secondary bladed wheel 12, in FIG. 2, the outer annular chamber 48' extends in the axial direction on both sides of the center plane E. Moreover, in the embodiment shown in FIG. 2, the diameter K' is somewhat larger than the diameter K for the hydraulic coupling shown in FIG. 1. In this way, the second delay chamber 48' is capable of accepting with greater probability the entire volume of operating fluid located at rest in the operating space 9 during the start-up phase. In another alternative embodiment from that shown in FIGS. 1 and 2, the outer annular chamber could also be located completely to the left of the center plane E with the result that the annular chamber is exclusively confining the primary bladed wheel 13. In this case, the annular chamber has large-bore ports connecting the operating space to the annular chamber.

Figure 3C:
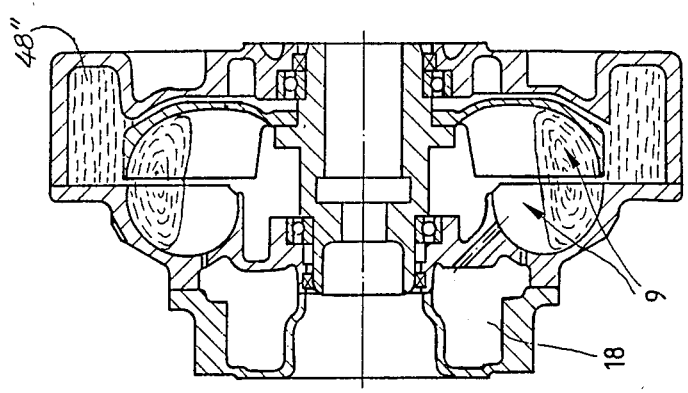
FIGS. 3a, 3b and 3c depict three different operating states of the hydraulic coupling similar to the embodiment illustrated in FIG. 1.
Figure 3B:
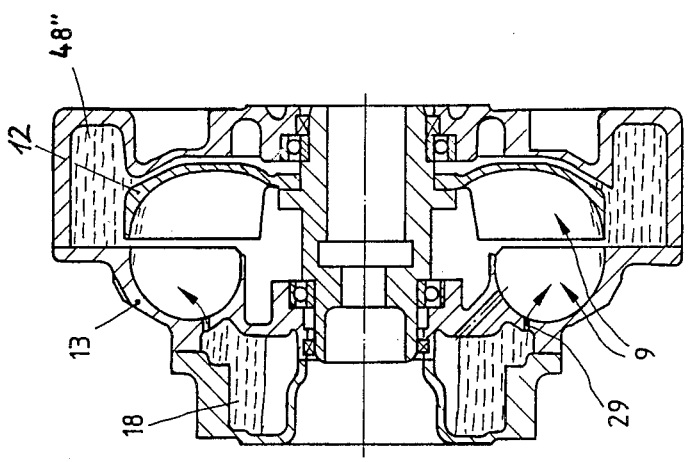
Figure 3A:
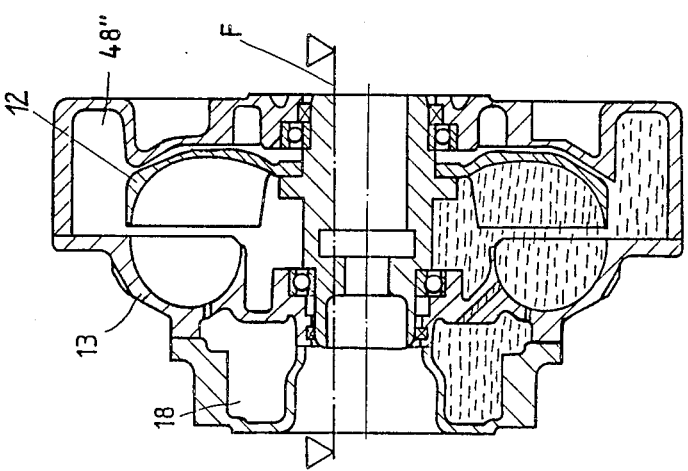

FIG. 3a illustrates a hydraulic coupling in accordance with the invention, at rest. The level of operating fluid inside the operating space of the coupling is slightly more than half. The fluid level is indicated by the line F. The second delay chamber 48'' only confines the secondary bladed wheel 12 as shown in FIG. 1. However, its diameter is greater than in FIG. 1.

FIG. 3b illustrates the moment at which the primary bladed wheel 13 has just started, with the secondary bladed wheel 12 still at rest. The operating fluid has accumulated in an annular shape at the outer walls of the delay chamber 18 and 48''. The operating space 9 has almost completely emptied its volume of operating fluid into the second delay chamber (outer annular chamber 48''). At the same time, the operating fluid begins to flow from the first delay chamber 18 through the throttle ports 29 into the operating space 9.

FIG. 3c illustrates the coupling in normal operation, i.e. after the start-up phase has terminated. The operating fluid previously located in the first delay chamber 18 has now almost completely been transferred to the operating space 9. The second delay chamber 48'' continues to store that part of the operating fluid which it received during start-up (FIG. 3b).

Figure 4:
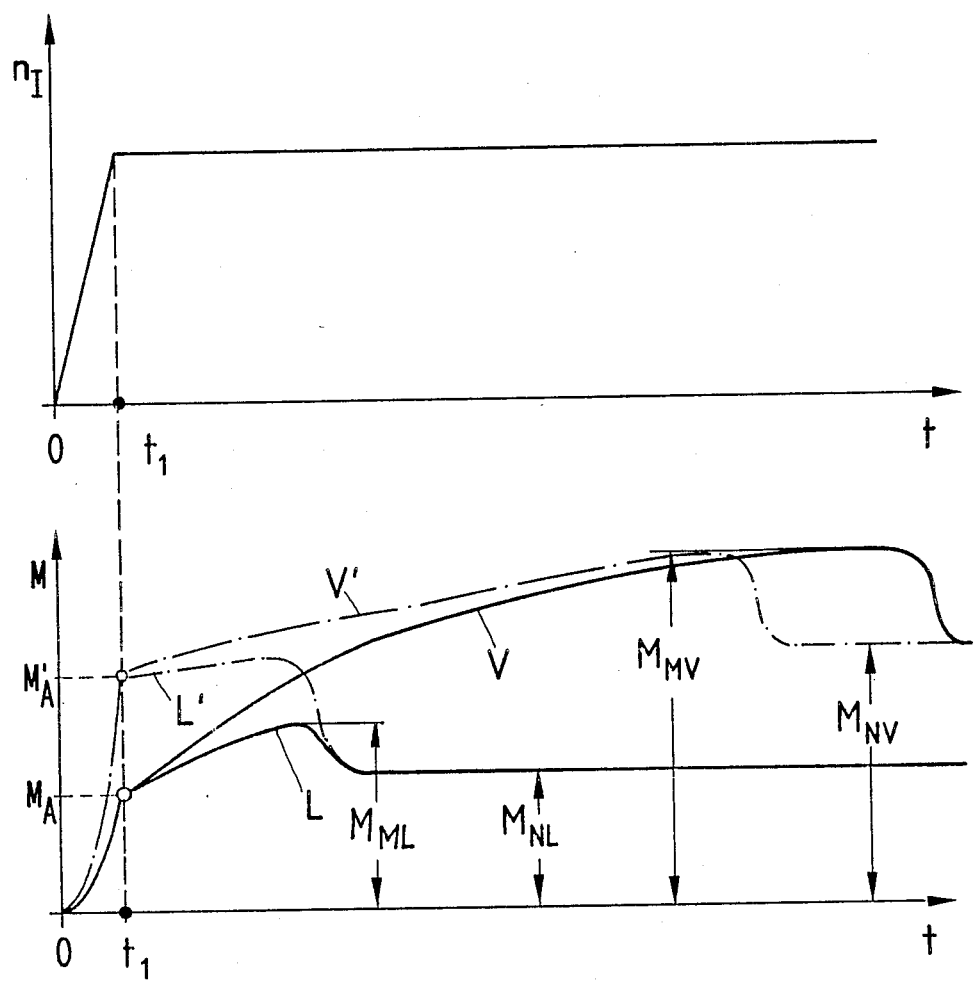
FIG. 4 portrays a graph of the properties of the hydraulic coupling in accordance with the invention.

The graphs depicted in FIG. 4 illustrate the behavior of the hydraulic coupling in accordance with the invention by way of using a conveyor belt drive as an example. The upper graph in FIG. 4 plots the primary rotation speed $n_I$ as a function of time t. It is assumed that the drive machine is started at t=0. It can be seen that the primary rotation speed attains its full value very rapidly (by time $t_1$).

The lower graph in FIG. 4 plots the coupling torque M as a function of time t. The continuous lines represent the parabolic rise of the coupling torque after start-up of the drive motor up to time $t_1$, when the primary rotation speed has attained its full value. At this point, the coupling torque has only attained a rather low value $M_A$. This is followed by rather flat gradients: along line V up to the maximum value $M_{MV}$ for a loaded conveyor belt, or along the even flatter line L up to a maximum value of $M_{ML}$ for an empty conveyor belt. In both cases, once the maximum values $M_{MV}$ and $M_{ML}$ have been attained, the torque characteristic falls to the drive torque $M_{NV}$ and $M_{NL}$ which the full or empty conveyor belt requires at its rated speed.

In comparison, the dot-dash lines represent the characteristic curves V' and L' obtained heretofore using a prior art hydraulic coupling. It can be seen that, hitherto at time $t_1$ (when the full primary rotation speed has been reached), the coupling torque $M_A'$ was nearly twice as high as for the coupling in accordance with the invention.

What is claimed is:

1. A hydraulic coupling of the type having a constant volume of operating fluid comprising: a bladed primary wheel and a bladed secondary wheel having an operating space therebetween and coupling axis means about which said bladed primary and secondary wheels can rotate independently from each other; a shell rotating common with said bladed primary wheel and enveloping the exterior of the secondary bladed wheel; and means defining a first delay chamber and a second delay chamber, both rotating with said blade primary wheel and having means for communicating with the operating space; wherein at least a substantial part of the second delay chamber is located at a greater distance from the coupling axis than the radial outer limitation of the operating space.

2. A hydraulic coupling as set forth in claim 1 wherein the part of the second delay chamber located exterior to the radially outer limitation of the operating space has a volumetric capacity of at least 10% of the volumetric capacity of the operating space.

3. A hydraulic coupling as set forth in claim 2 wherein the entire volumetric capacity of the second delay chamber is essentially located exterior to the radially outer limitation of the operating space.

4. A hydraulic coupling as set forth in claim 3 wherein the operating space and the second delay chamber are connected by means of a radially outer annular gap existing between the primary and secondary bladed wheels.

5. A hydraulic coupling as set forth in claim 1 wherein the operating space and the second delay chamber are connected by means of the radially outer annular gap existing between the primary and secondary bladed wheels.

6. A hydraulic coupling as set forth in claim 1 wherein at least one overflow channel is located radially to the center of the operating space and connects the first delay chamber with the operating space.

7. A hydraulic coupling as set forth in claim 1, wherein said communication means between said operating space and said second delay chamber is unrestricted and sufficiently large to permit at least almost complete transfer of operating fluid accumulated in the operating space when the hydraulic coupling is at rest to said second delay chamber at beginning of the coupling start-up phase.

8. A hydraulic coupling as set forth in claim 1, wherein said first delay chamber is an inner delay chamber with the entire chamber located intermediate the radial outer limitation of the operating space and the coupling axis.

9. A hydraulic coupling as set forth in claim 1, wherein at least a part of the second delay chamber confines the secondary bladed wheel.

10. A hydraulic coupling comprising:
   (a) a bladed primary wheel and a bladed secondary wheel defining a torous shaped operating space which can be filled with an operating fluid;
   (b) a coupling axis means about which said primary and secondary wheels rotate;
   (c) a coupling shell mounted for rotating common with said bladed primary wheel and enveloping the exterior of said bladed secondary wheel;
   (d) a first delay chamber and a second delay chamber; both mounted for rotation with said bladed primary wheel and having communication means with said operating space; and
   (e) at least one overflow channel located essentially radially to the center of the operating space connecting the first delay chamber with the operating space;
   wherein at least a substantial part of the second delay chamber is located at a greater distance from the coupling axis than the operating space outer limits.

11. The hydraulic coupling as set forth in claim 10, wherein said communication means between said operating space and said second delay chamber is large enough to permit substantially all operating fluid within the operating space when the hydraulic coupling is at rest to rapidly flow to the second delay chamber when the hydraulic coupling is started up and the communication means between said operating space and said first delay chamber includes control means for the flow of operating fluid from said first delay chamber to said operating space during operation of the hydraulic coupling.

* * * * *